United States Patent
Goldschmidt et al.

(10) Patent No.: US 12,224,979 B1
(45) Date of Patent: Feb. 11, 2025

(54) AUTOMATED VIRTUAL SUBNET DELEGATION IN A CLOUD ENVIRONMENT

(71) Applicant: Dell Products L.P., Round Rock, TX (US)

(72) Inventors: Jason Goldschmidt, Newton, MA (US); Michael Marrotte, Windermere, FL (US); John P Marchese, Jr., East Hampton, CT (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/363,092

(22) Filed: Aug. 1, 2023

(51) Int. Cl.
  *H04L 61/5007* (2022.01)
  *H04L 9/40* (2022.01)
  *H04L 61/5061* (2022.01)

(52) U.S. Cl.
  CPC ...... *H04L 61/5007* (2022.05); *H04L 61/5061* (2022.05); *H04L 63/20* (2013.01)

(58) Field of Classification Search
  CPC .. H04L 61/5007; H04L 61/5061; H04L 63/20
  See application file for complete search history.

(56) References Cited

U.S. PATENT DOCUMENTS

| | | | |
|---|---|---|---|
| 10,148,493 B1* | 12/2018 | Ennis, Jr. | H04L 61/5076 |
| 11,456,987 B1* | 9/2022 | McKim | H04L 61/5007 |
| 2008/0198858 A1* | 8/2008 | Townsley | H04L 61/2535 370/392 |
| 2018/0367501 A1* | 12/2018 | Khan | H04L 61/5007 |
| 2022/0191168 A1* | 6/2022 | Snehashis | H04L 41/22 |

* cited by examiner

*Primary Examiner* — Philip C Lee
(74) *Attorney, Agent, or Firm* — AMIN, TUROCY & WATSON, LLP

(57) ABSTRACT

The technology described herein is directed towards automatic virtual subnet delegation. An automated process scans the subnets of a virtual network and builds a tree of the IP space, including allocated and unused space designations. User-defined parameters and organization policy data are used to determine the number of IP addresses needed for an application or the like. By traversing the tree of existing IP space, the technology described herein finds and places a new subnet, such as to ensure a high utilization of the overall IP space or based on an alternative type-of-fit criterion. When the virtual subnet space is created in the cloud, a public cloud-specific subnet identifier is returned to the user to utilize in deploying the application. Another use of the technology described herein is to track and optimize IP space allocation for existing virtual networks in the public cloud, including to identify underutilized and/or improperly-sized subnets.

20 Claims, 12 Drawing Sheets

AUTOMATED VIRTUAL SUBNET DELEGATION IN A CLOUD ENVIRONMENT

BACKGROUND

Virtual subnets are a fundamental building block in cloud network architecture, enabling users to isolate and segment different workloads and applications. However, the process of sizing virtual subnets in the public cloud can be complex and time-consuming, as doing so requires users to manually calculate and allocate internet protocol (IP) addresses, subnet masks, and routing tables. Tracking allocated versus unallocated IPv4 ranges can be challenge for a large organization running a business in the public cloud. Typically, allocated IP ranges are tracked manually, leading to a slow turnaround for requests to allocate new network space in the public cloud.

As a result, a negative behavior seen in large organizations is that when developers request IP address ranges, they are hoarded. This is because getting a requested IP address range tends to take a long time. Such hoarding leads to sub-optimal usage of the overall routable IP space.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
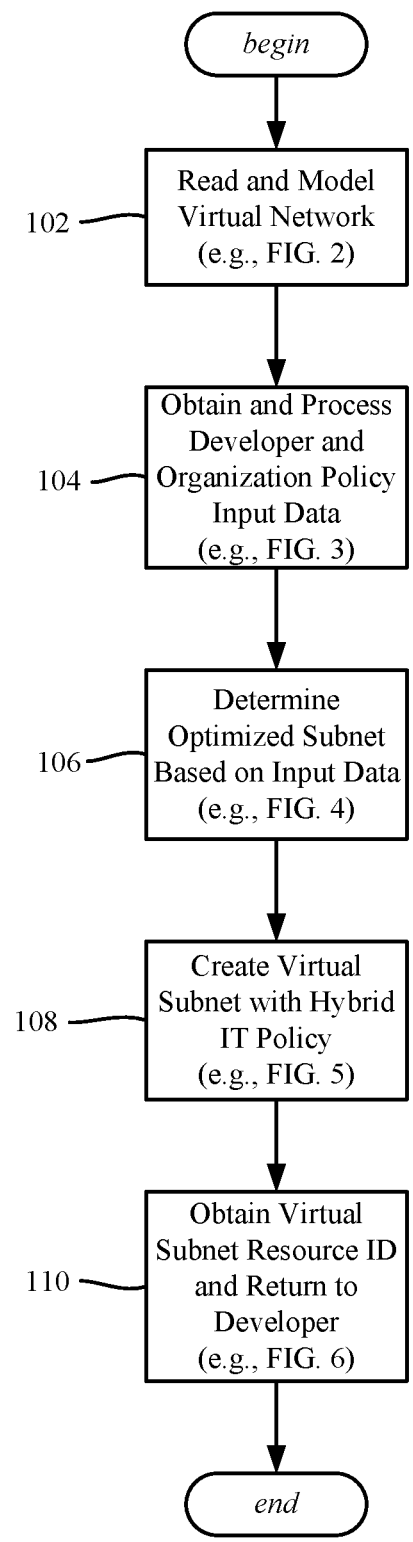
FIG. 1 is a flow diagram showing example operations related to automated virtual subnet delegation, in accordance with various aspects and implementations of the subject disclosure.

Various aspects of the technology described herein are generally directed towards sizing and allocating virtual subnets (ranges of IPv4 addresses) in the public cloud, using an automated process to determine subnet placement in a virtual network (alternatively referred to as a virtual private cloud). Determining subnet placement is performed by an automatic virtual subnet delegation process (an automated virtual subnet delegator) that rapidly scans the subnets of a virtual subnet and builds a tree of the existing IP space, including identifying which subnets of address IP ranges are allocated and which address space is unused. Based on input data, the automated virtual subnet delegator a uses selected strategy to find the most appropriate classless inter-domain routing (CIDR) block (subnet) available, and takes action to allocate that subnet.

The user input submitted with a request for IP address space includes user-defined parameters, which are used to determine the number of IP addresses needed for a given application. The automated virtual subnet delegator can convert the constructs (e.g., hosts, containers, endpoints) with which application developers are familiar into an appropriately sized virtual subnet. By traversing the tree model of existing IP space, the automated virtual subnet delegator can find and optimally (or nearly-optimally) place the new subnet to ensure a high utilization of the overall IP space. As described herein, the subnet prefix length and IP address range of the new subnet can be mathematically determined, and organizational (e.g., hybrid IT) policies can be applied in creating a new subnet. When operations of the automated virtual subnet delegator are complete, a public cloud specific subnet identifier (e.g., a subnet resource identifier, which can be a subnet resource name or the like) is returned to the requesting entity (e.g., user) to utilize in deploying an application.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state.

Typically, in hybrid cloud environments, a centralized IT organization sets policy and permissions for subnet creation and delegation for application use. The IT organization carves out a large, non-overlapping IP space to use in the public cloud, which does not conflict with on-premises network numbering. When an application developer or the like (e.g., test personnel) needs a new subnet such as to deploy an application, the IT organization is asked to request or create a subnet that meets the developer's needs. However, this process requires knowledge of how to manually calculate and allocate IP addresses through the use of subnet masks and/or subnet prefix-length. This is an unreliable, manually performed operation, often by someone working outside his or her area of expertise, and often if not usually results in subnets being sub-optimally sized, that is, either too big for the application needs, or too small and resulting in limits for future scaling.

In contrast to existing methods, the technology described herein provides an automated solution for sizing virtual subnets in the public cloud, using automated processes, and in one example implementation, machine learning techniques, to optimize subnet sizing and configuration. The automated virtual subnet delegator enables application developers to create and manage virtual subnets in the public cloud, including but not limited to AMAZON WEB SERVICES (AWS), MICROSOFT AZURE, AND GOOGLE CLOUD PLATFORM (GCP). As described herein, the overall automated virtual subnet delegator system uses a combination of user-defined parameters, algorithms, and hybrid IT policy to calculate a generally optimal size and configuration of virtual subnets, based on factors that the application developer describes.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 2:
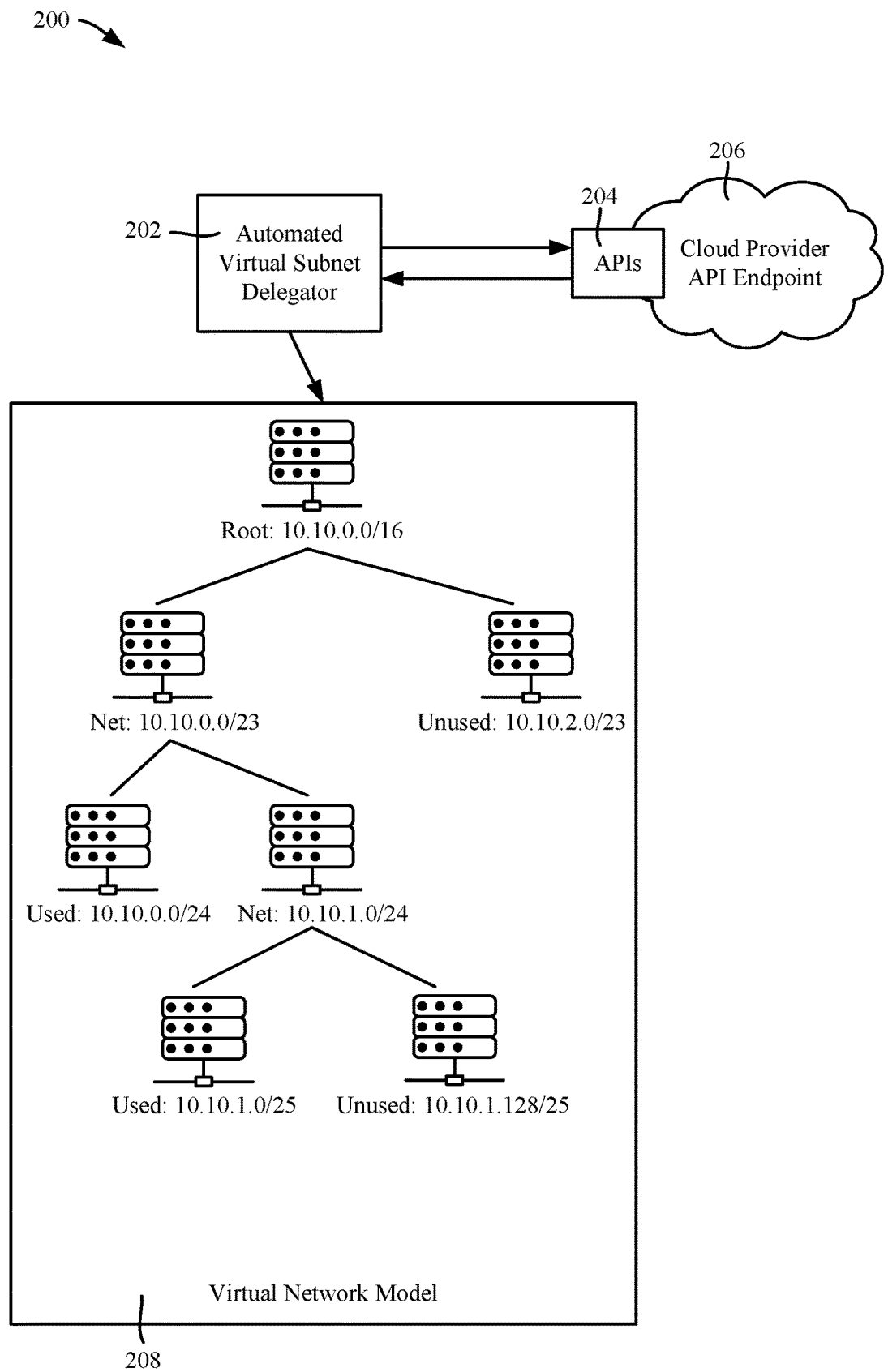
FIG. 2 is an example representation of constructing a model (e.g., a tree data structure) to represent virtual subnet space, including allocated subnets and unused subnet space, in accordance with various aspects and implementations of the subject disclosure.

FIG. 1 is a flow diagram of example operations that generally described automated virtual subnet delegation based on the technology described herein. Example operation 102 represents reading and modeling the virtual network as maintained by the cloud provider, as described herein. In general, example operation 102 as further described with reference to the example system/architecture 200 of FIG. 2, is performed by an automated virtual subnet delegator 202 that communicates via APIs 204 with the cloud provider 206 (API endpoint(s)). The virtual subnet delegator 202 requests from the cloud provider 206, and obtains the allocated and unused (not-currently allocated) subnet ranges. In one implementation, virtual subnet delegator 202 builds a tree data structure 208 based on the allocated (Net) IPv4 address ranges and unused address ranges.

Figure 3:
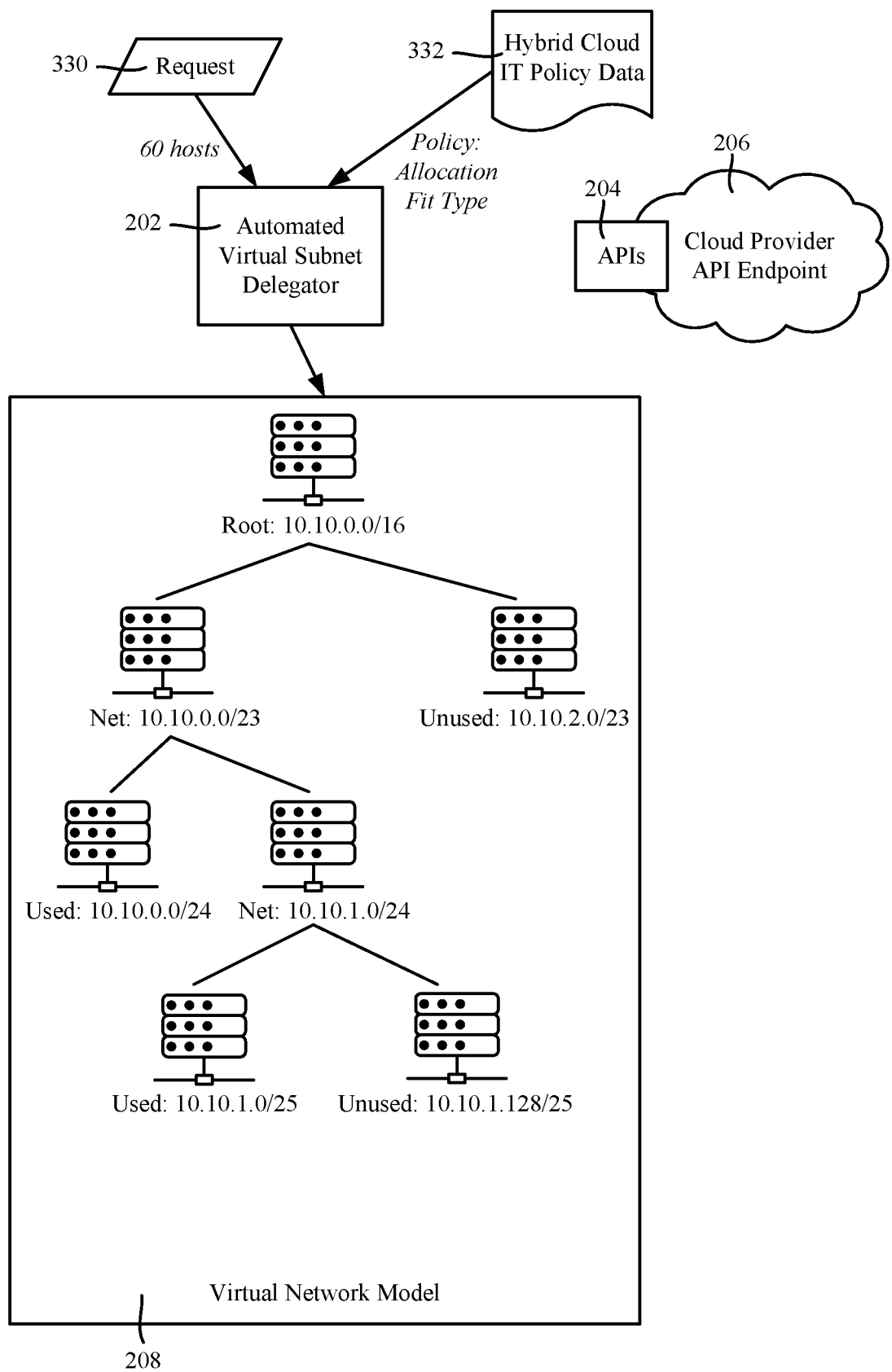
FIG. 3 is an example representation of accessing the virtual subnet space model (e.g., of FIG. 2) based on input data, in accordance with various aspects and implementations of the subject disclosure.

Operation 104 of FIG. 1 represents obtaining and processing (reading) input data, e.g., from a requesting developer, and policy input data, e.g., of an organization/enterprise. In general, at example operation 104, as further described with reference to FIG. 3, the automated virtual subnet delegator 202 obtains and processes (reads) input data, which in this example is a combination of a request 330 (FIG. 3) and organization policy data 332 (e.g., hybrid cloud IT policy data). In the example of FIG. 3, the request is for a specific number (e.g., 60) of hosts, or IP addresses.

Non-limiting example user-defined request input data can include:
  number of virtual hosts;
  container instance data (where a container instance runs packaged software coupled to a virtual network subnet);
  scale sets parameter data (scale sets are groups of automatically scaled virtual machines, defined with a virtual subnet); and
  on-premises routing data (routing information related to a virtual subnet, particularly application programming interface (API) endpoints).

In general, when a user (or process on behalf of a user) submits a request, the associated input data can be used to determine how many virtual addresses are needed. Typically, only one input type is submitted, e.g., number of virtual hosts OR container instances OR scale sets parameters; the automated virtual subnet delegator 202 can determine/estimate a corresponding subnet size based on the submitted container instance data or scale sets parameter data.

Non-limiting example organizational (e.g., hybrid cloud IT) policy can include:
  virtual network IP space data;
  security rules data;
  identity and access management (IAM) roles data;
  audit service data; and
  organizational billing and governance tags data.

The policy data can be used to check (deny and/or limit) the requested subnet address range, as well as track the usage thereof once allocated. An error or notification can be returned, for example, if policy will be violated by a request, or if the policy will limit the request.

Returning to the operations of FIG. 1, example operation 106 represents determining an optimized subnet based on the input data (request 330 and policy data 332). Example operation 106 is further described with reference to FIG. 4, in which the automated virtual subnet delegator 202 scans the virtual network model (via a tree scan component 440) to find one or more candidate subnets that match the input data's requirements. Note that an error can be returned if a suitable matching subnet cannot be found, e.g., the request is for more address space than remains available to allocate.

Decision logic 442 (which can, for example be based on decision trees) can be used to direct the scanning, e.g., based on type-of-fit criterion described herein, and, in the event multiple suitable candidate subnets are found, to select one as the subnet to allocate. Note that one possible way to do this is to scan the tree data structure to determine a group of candidate subnets based on accommodation size only, and then decide on a subnet from among the group based on the other input data, such as policy. Some pre-scanning may be done to obtain size-based groups of candidates in anticipation of incoming subnet requests. In any event, in the example of FIG. 4, a candidate subnet 444 (highlighted in FIG. 4 by dashed block 444) has been determined as the subnet to allocate.

Figure 5:
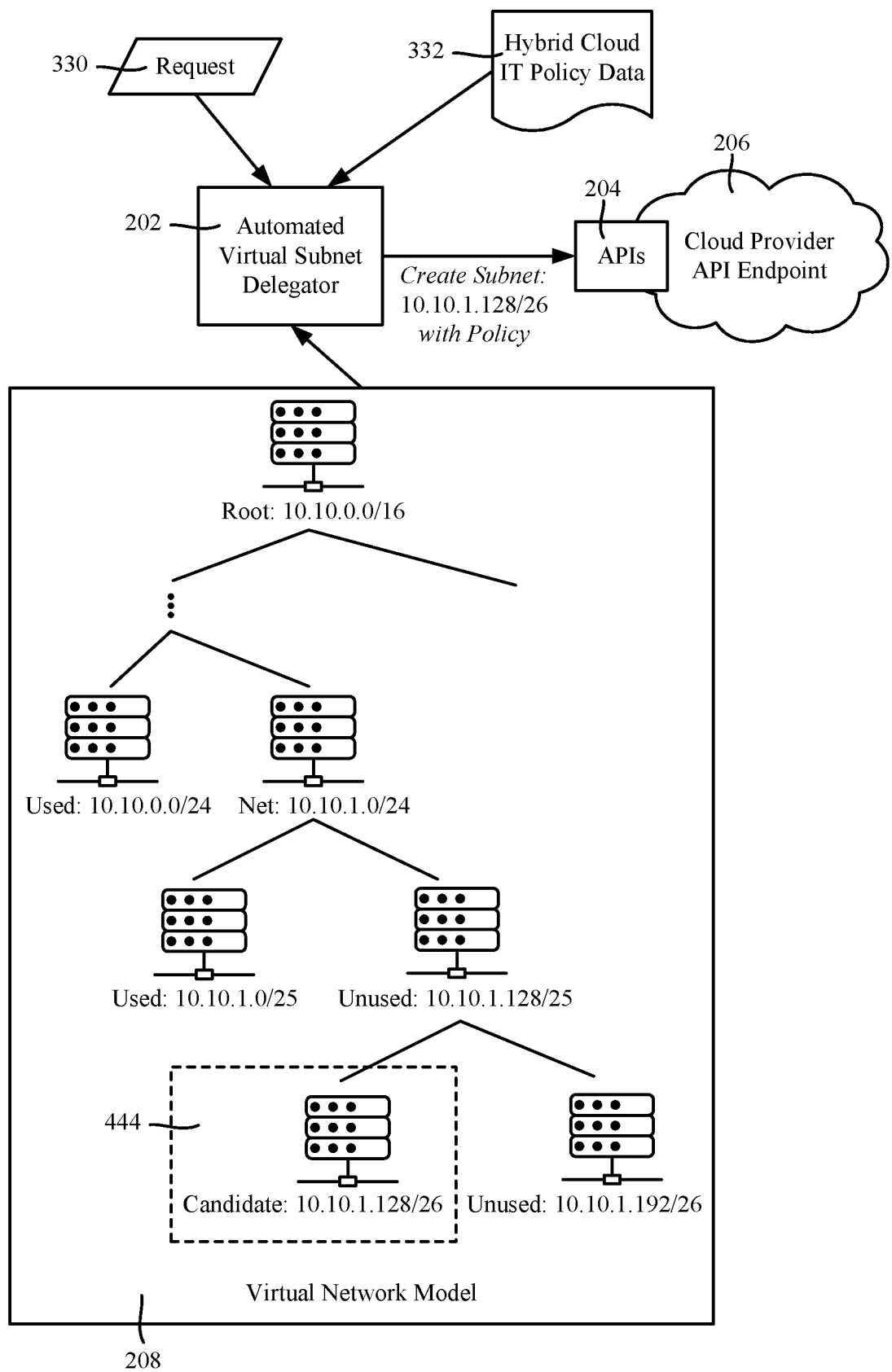
FIG. 5 is an example representation of creating a virtual subnet in the virtual subnet space of a cloud provider, in accordance with various aspects and implementations of the subject disclosure.

Once the subnet to allocate has been determined, operation 108 and FIG. 5 represent communicating with the cloud provider API endpoint 206 via the APIs 204 to request creation of the identified subnet. This is shown in FIG. 5 by the arrow from the automated virtual subnet delegator 202 to the APIs 204.

Figure 6:
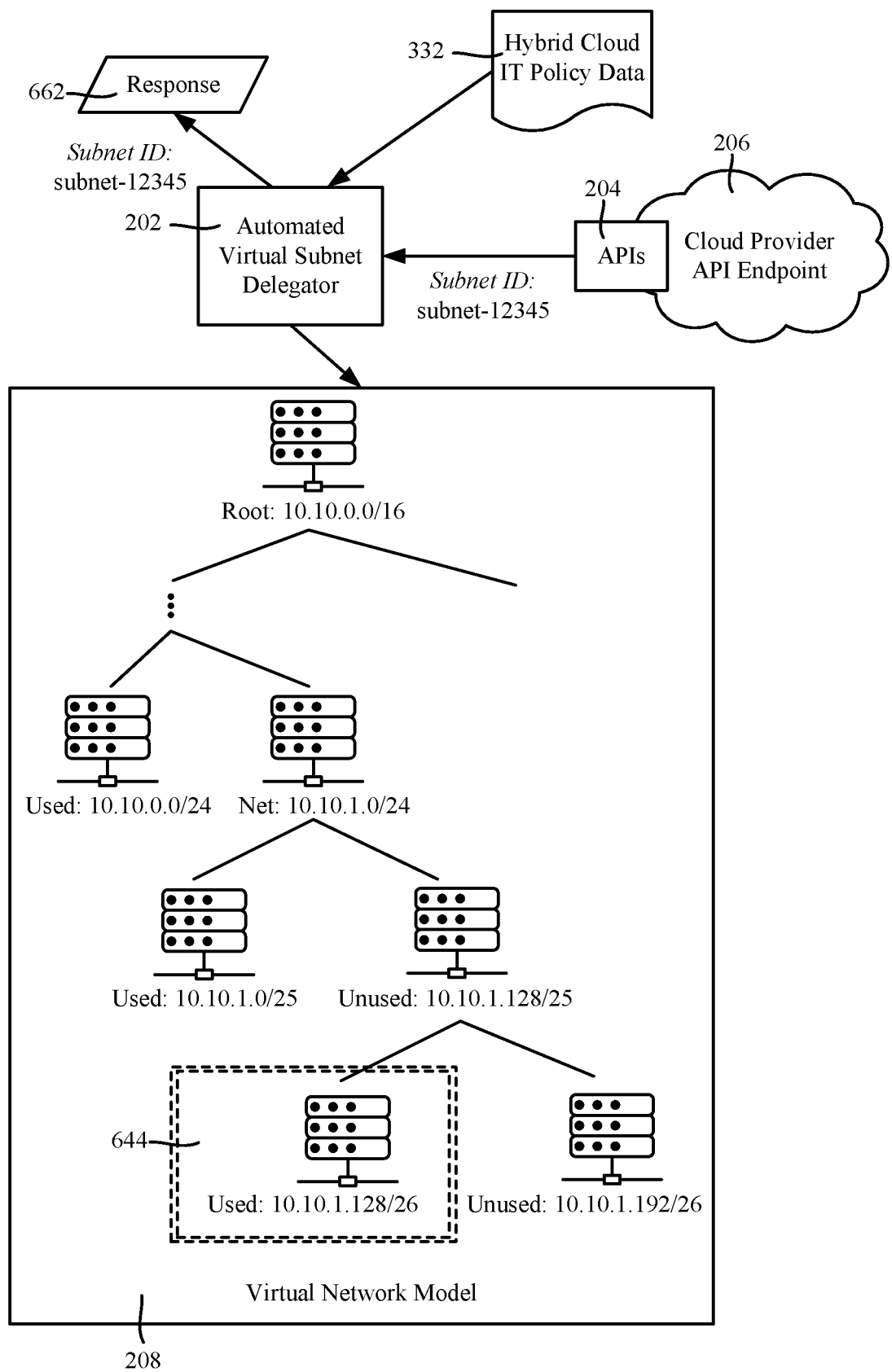
FIG. 6 is an example representation of returning a virtual subnet resource identifier obtained from the cloud provider after creating the virtual subnet (e.g., as in FIG. 5), in accordance with various aspects and implementations of the subject disclosure.

As shown in FIG. 6 and operation 110 of FIG. 1, in response to the create request, the cloud provider returns a virtual subnet resource identifier (ID) to the automated virtual subnet delegator 202; (because the virtual network model 208 accurately reflects the current state of the virtual network/virtual private cloud IP address space, unless some other way to delegate virtual address space exists there should not be an error under normal conditions). The virtual subnet resource ID is returned to the requesting entity (e.g., developer) in a response 662.

Figure 4:
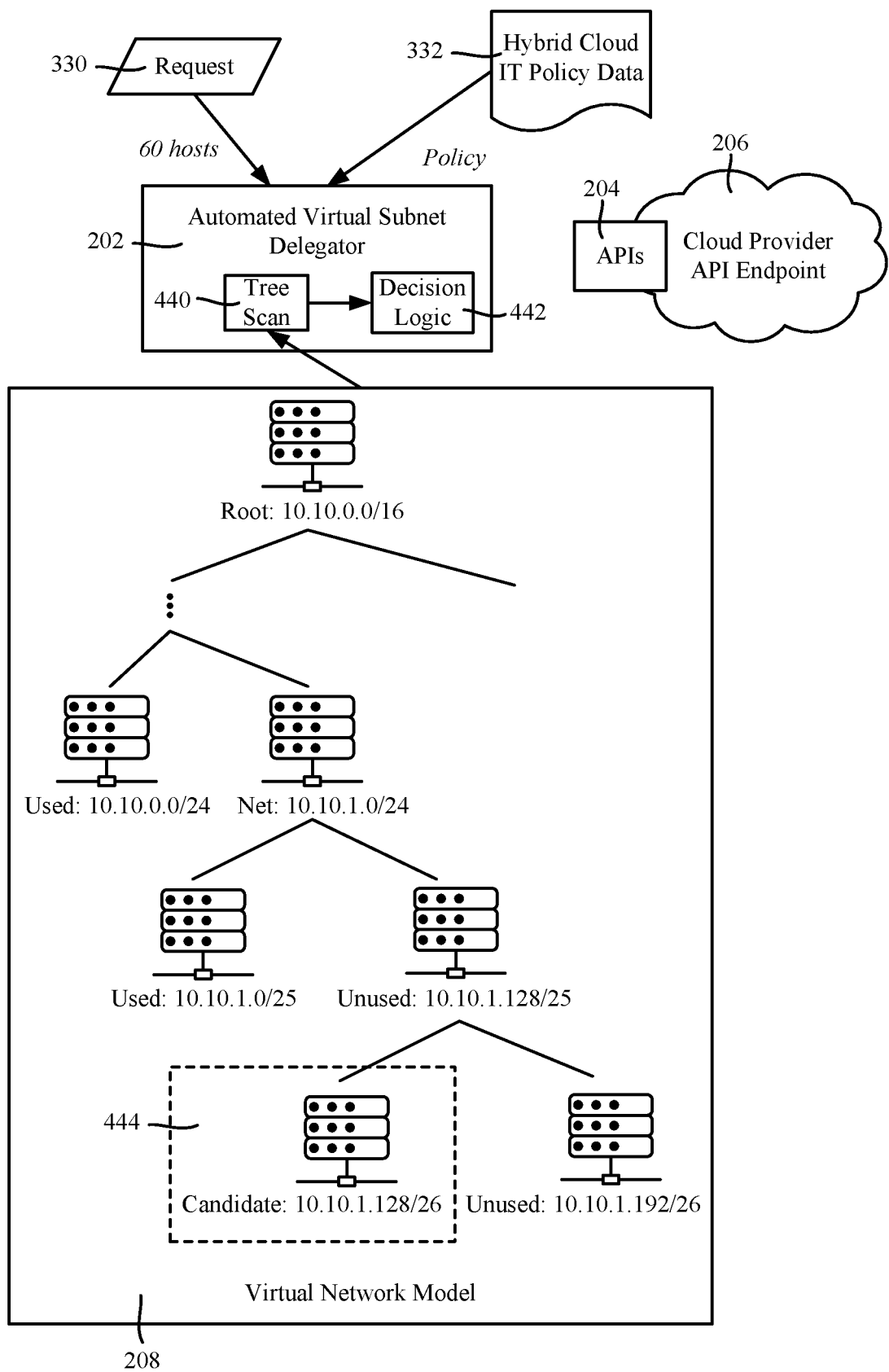
FIG. 4 is an example representation of scanning the virtual subnet space model (e.g., of FIG. 2) to determine/select a subnet based on the input data (e.g., of FIG. 3), in accordance with various aspects and implementations of the subject disclosure.

Further, the virtual network (tree) model is updated (e.g., transactionally with the create request/return of the virtual subnet resource ID) to indicate that the space is now used. In the example of FIG. 6, the candidate subnet 440 of FIGS. 4 and 5 is now indicated as used space (highlighted in FIG. 6 by double-dashed block 664).

To summarize thus far, via input data, developers or the like describe subnet address range needs expressly or in terms familiar to them. This may be the number of virtual hosts required, container services, automated scale sets and/or API endpoints. Based on the terms, the technology described herein automatically determines and delegates a subnet that is (close to) optimally sized for the described needs, as well as meeting hybrid IT organizational-specific policies. This set represents the user-defined parameters. In conjunction with the user-defined parameters, a hybrid IT policy can also be defined to apply organizational specific rules, security policy and governance. The user-defined parameters and hybrid IT policy become inputs to a process that automatically produces an optimally sized virtual subnet for the use by the application developer.

One type of subnet allocation is based on "best-fit" criterion, where a suitable formula to automatically calculate the appropriate classless inter-domain routing (CIDR) needed for a best fit subnet is:

CIDR prefix=32-ceil(log 2(number of hosts+2); (note that the +2 is to account for the network and broadcast address).

Number of hosts=2^(32−CIDR prefix)−2.

Thus, by way of an example for a request determined from the input data as a request corresponding to 500 hosts:

CIDR prefix=32−ceil(log 2(500+2))

CIDR prefix=32−ceil(log 2(502))

CIDR prefix=32−9(since 2^9=512)

CIDR prefix=23

The "best-fit" criterion is only one type of fit that the automated virtual subnet delegator 202 can use in selecting the corresponding resultant subnet. The type-of-fit criterion can be specified as part of the input data (e.g., that overrides a default subnet type-of-fit indicator), whether input via the user data, the policy data or a separate input. For example, an organization may want all subnets to be delegated according to the best-fit criterion without special permission, and thus the indication may be set in the policy data. Note that in general, if best-fit is used for all subnet allocation, fragmentation of the subnets within the overall virtual IP address space can be minimized.

Another organization may allow developers to select among the best fit or another type of fit criterion depending on their needs. Some non-limiting examples of other type-of fit criterion are set forth below.

An alternative type-of fit criterion is referred to as a "worst-fit" strategy. If selected, this strategy allocates the largest available CIDR block remaining in the virtual network. The worst-fit strategy can result in excessive fragmentation, as smaller blocks may remain unused. However, worst-fit can be beneficial in situations where future growth is expected, and a developer's goal is to minimize the risk of running out of address space.

A first-fit strategy allocates the first available CIDR block, found while traversing the tree (e.g., top-down) during scanning that can accommodate the requested number of hosts. While faster than the best-fit strategy, first-fit can potentially lead to higher fragmentation.

A next-fit strategy is similar to the first-fit strategy but with a slight modification, in that next-fit is based on maintaining a pointer to the last allocated block, and searching the tree model data structure for the next available block from that point forward. The next-fit is approach can help spread the allocations more evenly across the address space.

A random-fit strategy randomly selects an available CIDR block that can accommodate the requested number of hosts. The random-fit approach can help avoid some fragmentation issues, but may not result in optimal or close-to optimal allocations.

A hierarchical allocation strategy allocates IP addresses and subnets based on a defined network hierarchy, such as geographical locations or organizational units. This approach can help improve network management and security, but may not always result in the most efficient use of address space.

In one example implementation generally described with reference to FIG. 7, an artificial intelligence/machine learning (AI/ML) model strategy is used, based on learning one or more models to analyze the subnets currently allocated and how they are placed. In inference, a model 770(i) (where "i" represents inference) can be used as part of an automated virtual subnet delegator 702 to select the IP subnet size and placement based on the current state of the tree structure 708, and the input data, e.g., in requests 730 and policy data 732.

Figure 7:
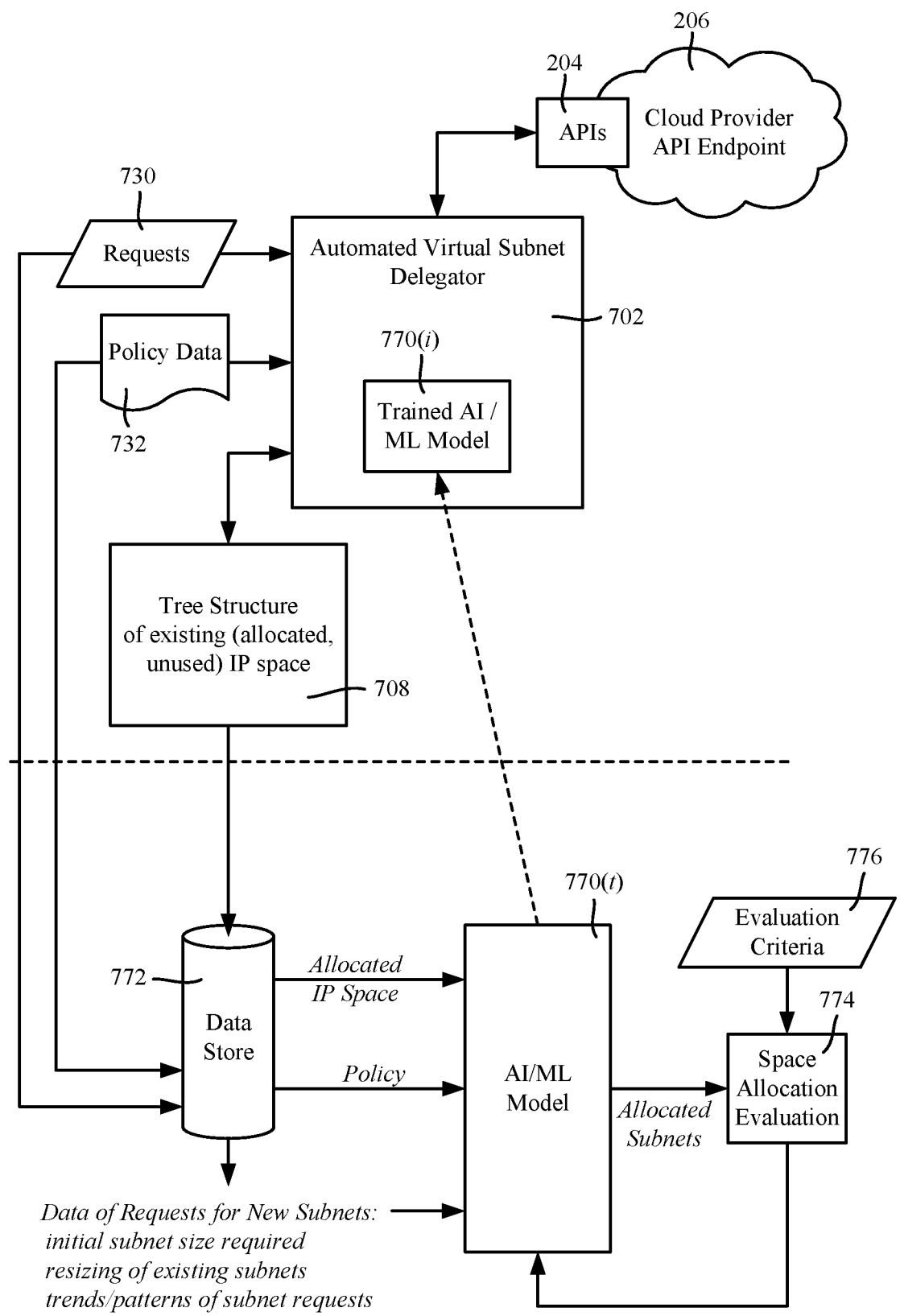
FIG. 7 is an example block diagram representation of an example system/architecture in which an automated virtual subnet delegator includes a trained artificial intelligence/machine learning (AI/ML) model for determining and delegating subnets, in accordance with various aspects and implementations of the subject disclosure.

In addition, as shown in the lower portion of FIG. 7, the model 770(t) (where "t" represents training) continuously (or as part of regular retraining) analyzes the requests 730 for new subnets in terms of initial subnet size required, resizing of existing subnets, and trends/patterns of the subnet requests. These data can be maintained in a data store 772. In a training mode, these factors are used to automatically determine a strategy to use for placement, e.g., to minimize fragmentation. More particularly, the AI/ML model training operates to more closely optimize virtual subnet allocation and configuration by processing historical data (e.g., in the data store 772), extracting relevant features, and training a supervised learning model 770(t) to predict optimal subnet allocations during inference (AI/ML model 770(i)). As new data becomes available, the AI/ML model 770(i) is (e.g., periodically or otherwise) updated to adapt to changing network conditions, application requirements, and organizational policies, ensuring efficient resource utilization and tailored solutions in public cloud environments.

In general, AI/ML techniques can dynamically change strategies; the AI model 770(*i*) in inference can be continuously or regularly improved to outperform other and decision-making strategies. Note that in addition to an AI/ML approach, the technology includes input of the IT policies (e.g., to manually set certain parameters) as desired.

In addition to subnet placement and allocation, the automated virtual subnet delegator 202 (or 702 with AI/ML) can also (or alternatively) be used by hybrid IT organizations to track and optimize IP space allocation for existing virtual networks in the public cloud. In this mode, an automated virtual subnet delegator eliminates the need for an IT administrator to keep a manual record of IP address allocation and subnet configuration data. Further, underutilized and/or improperly-sized subnets can be identified by the technology described herein to facilitate improved IP space utilization for an organization's public cloud virtual network (s).

Figure 8:
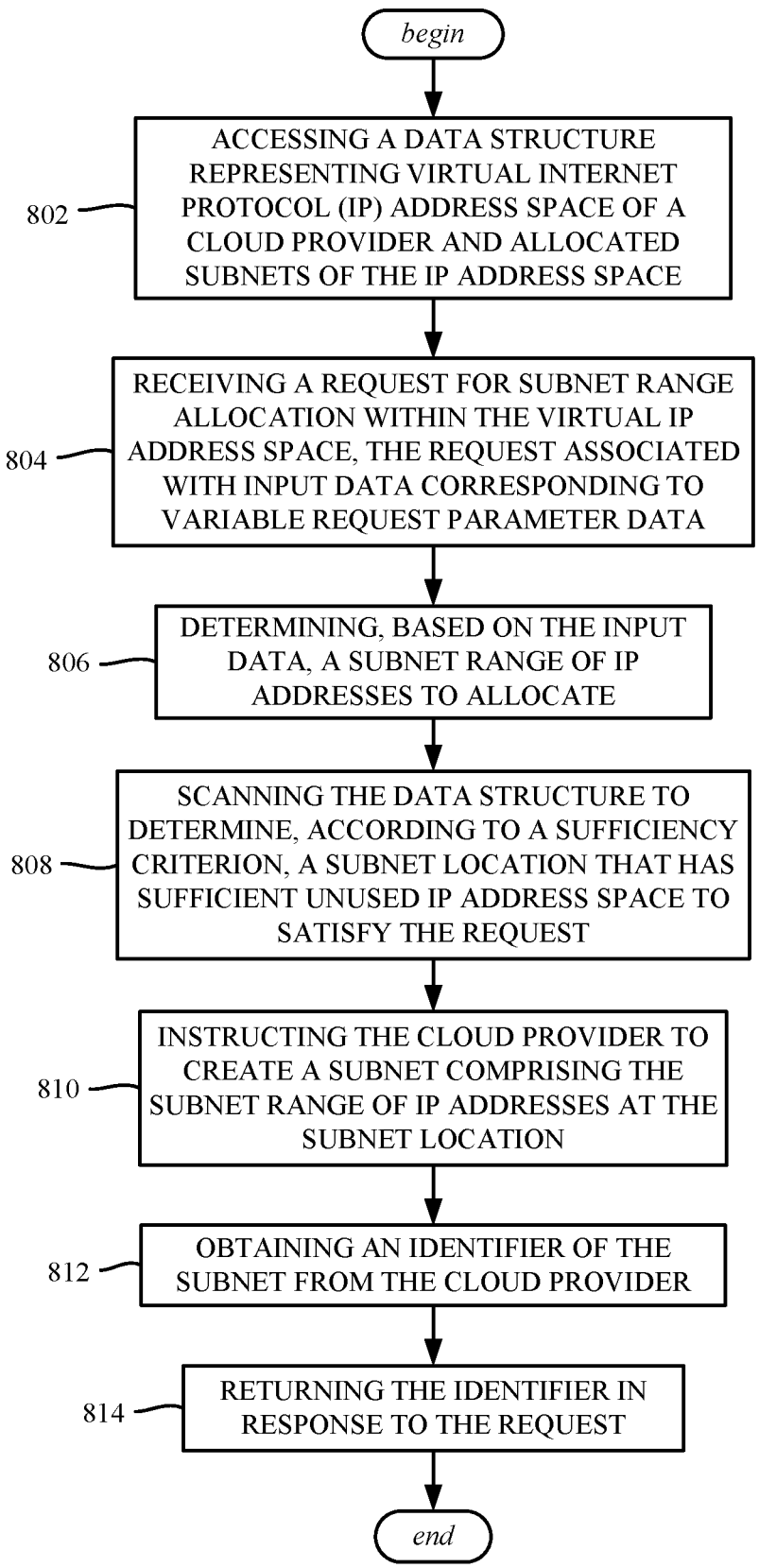
FIG. 8 is a flow diagram showing example operations related to determine a subnet location based on input data and creating a subnet at that virtual location in virtual subnet space, in accordance with various aspects and implementations of the subject disclosure.

One or more aspects can be embodied in a system, such as represented in the example operations of FIG. 8, and for example can include a memory that stores computer executable components and/or operations, and a processor that executes computer executable components and/or operations stored in the memory. Example operations can include operation 802, which represents accessing a data structure representing virtual internet protocol (IP) address space of a cloud provider and allocated subnets of the IP address space. Example operation 804 represents receiving a request for subnet range allocation within the virtual IP address space, the request associated with input data corresponding to variable request parameter data; Example operation 806 represents determining, based on the input data, a subnet range of IP addresses to allocate. Example operation 808 represents scanning the data structure to determine, according to a sufficiency criterion, a subnet location that has sufficient unused IP address space to satisfy the request. Example operation 810 represents instructing the cloud provider to create a subnet comprising the subnet range of IP addresses at the subnet location. Example operation 812 represents obtaining an identifier of the subnet from the cloud provider. Example operation 814 represents returning the identifier in response to the request.

Further operations can include updating the data structure to indicate that the subnet range of IP addresses at the subnet location are allocated addresses.

The input data can include at least one of: a number of virtual hosts, container instance data, scale set parameter data, or on-premises routing data.

Further operations can include obtaining, from cloud computing equipment associated with the cloud provider, the IP address space and allocation data corresponding to allocated subnets of the IP address space, and constructing the data structure based on the IP address space and the allocated subnets of the IP address space.

Further operations can include inputting policy data, and wherein the determining of the subnet range of IP addresses to allocate is further based on the policy data.

The policy data can include at least one of: virtual network IP space data, security rule data, identity and access management role data, audit service, organizational billing data, or governance tag data.

Determining the subnet range of IP addresses to allocate and the scanning of the data structure to determine the subnet location can include invoking a trained model.

Determining the subnet range of IP addresses to allocate is further based on subnet type-of-fit criterion data.

The subnet type-of-fit criterion data can include a best-fit indication, and scanning the data structure to determine the subnet location can include determining a group of candidate unused subnet locations, and selecting a candidate unused subnet location from the group that results in less fragmentation of allocated subnets relative to at least one other candidate unused subnet location of the group.

The subnet type-of-fit criterion data can include a worst-fit indication, the subnet range of IP addresses is to be determined as a largest available range of IP addresses of an unused subnet, and scanning the data structure to determine the subnet location can include determining a group of candidate unused subnet locations, and selecting a candidate unused subnet location from the group that results in a largest available subnet.

The subnet type-of-fit criterion data can include a first-fit indication, and scanning the data structure to determine the subnet location can include selecting a first unused subnet location found while scanning from which the subnet range of IP addresses is able to be allocated.

The subnet type-of-fit criterion data can include a next-fit indication, and scanning the data structure to determine the subnet location can include scanning from a starting location that is based on a previously created subnet, and selecting a first unused subnet location found while scanning, based on the starting location, from which the subnet range of IP addresses is able to be allocated.

The subnet type-of-fit criterion data can include a random-fit indication, and scanning the data structure to determine the subnet location can include randomly selecting a first unused subnet location from which the subnet range of IP addresses is able to be allocated.

The subnet type-of-fit criterion data can include a hierarchical allocation indication, and scanning the data structure to determine the subnet location can include selecting a first unused subnet location from which the subnet range of IP addresses is able to be allocated based on defined network hierarchy data.

Figure 9:
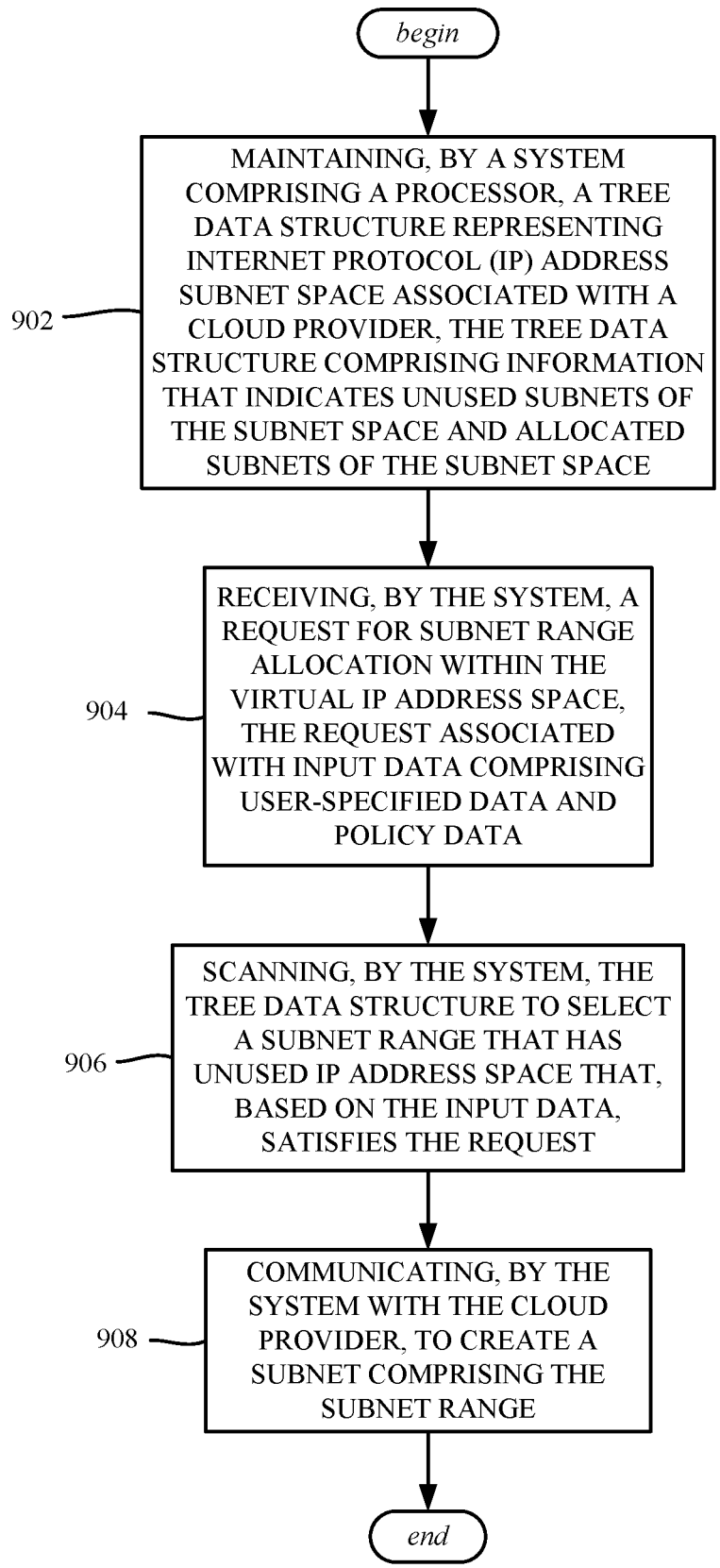
FIG. 9 is a flow diagram showing example operations related to scanning a tree data structure to select a subnet range of unused IP address space and communicating with a cloud provider to create a corresponding subnet, in accordance with various aspects and implementations of the subject disclosure.

One or more example aspects, such as corresponding to example operations of a method, are represented in FIG. 9. Example operation 902 represents maintaining, by a system comprising a processor, a tree data structure representing internet protocol (IP) address subnet space associated with a cloud provider, the tree data structure comprising information that indicates unused subnets of the subnet space and allocated subnets of the subnet space. Example operation 904 represents receiving, by the system, a request for subnet range allocation within the virtual IP address space, the request associated with input data comprising user-specified data and policy data. Example operation 906 represents scanning, by the system, the tree data structure to select a subnet range that has unused IP address space that, based on the input data, satisfies the request. Example operation 908 represents communicating, by the system with the cloud provider, to create a subnet comprising the subnet range.

Scanning the tree data structure can include determining a group of candidate subnet ranges that have sufficient unused IP address space to satisfy the request; further operations can include selecting, by the system, the subnet range from among the candidate subnet ranges based on the input data.

Further operations can include receiving, by the system from the cloud provider, an identifier of the subnet comprising the selected subnet range, and returning, by the system, the identifier in response to the request.

Further operations can include updating, by the system, the tree data structure with updated information that indicates that the selected subnet range is allocated subnet space.

Figure 10:
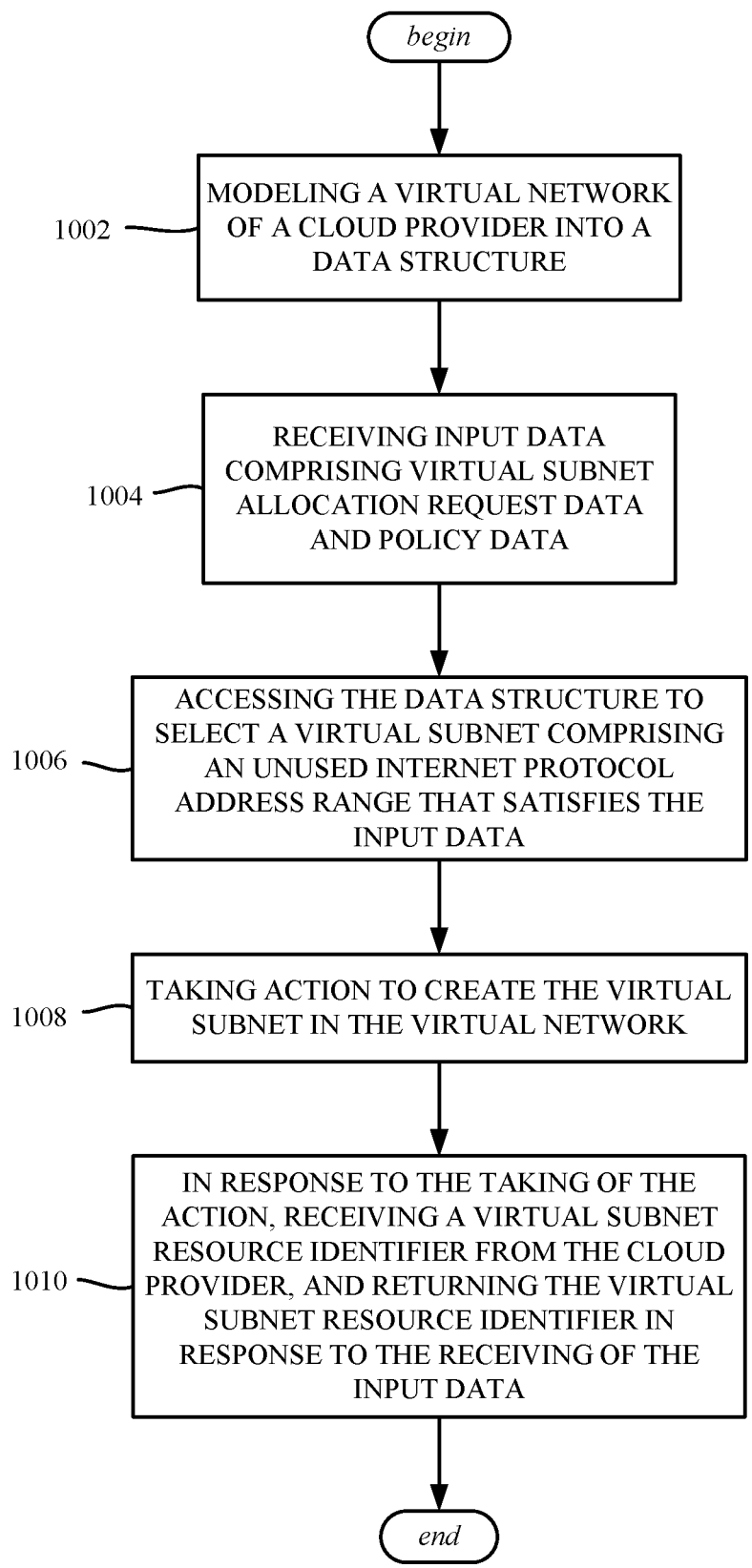
FIG. 10 is a flow diagram showing example operations related to accessing a data structure to select a virtual subnet of an unused internet protocol address range and taking action to create a corresponding virtual subnet in a virtual network, in accordance with various aspects and implementations of the subject disclosure.

FIG. 10 summarizes various example operations, e.g., corresponding to a machine-readable medium, comprising executable instructions that, when executed by a processor, facilitate performance of operations. Example operation 1002 represents modeling a virtual network of a cloud provider into a data structure. Example operation 1004 represents receiving input data comprising virtual subnet allocation request data and policy data. Example operation 1006 represents accessing the data structure to select a virtual subnet comprising an unused internet protocol address range that satisfies the input data. Example operation 1008 represents taking action to create the virtual subnet in the virtual network. Example operation 1010 represents, in response to the taking of the action, receiving a virtual subnet resource identifier from the cloud provider, and returning the virtual subnet resource identifier in response to the receiving of the input data.

Further operations can include determining a subnet prefix corresponding to a subnet range length based on the input data, and wherein the accessing of the data structure to select the virtual subnet can include scanning the data structure to determine a group of candidate virtual subnet ranges that have sufficient unused IP address space to satisfy the subnet range length, and selecting the virtual subnet from the candidate virtual subnet ranges based on type-of-fit criterion data.

As can be seen, the technology described herein facilitates virtual subnet sizing and configuration in public cloud environments, including via user-friendly input data. The technology described herein intelligently selects the most suitable space for subnet allocation by considering specific application requirements (in a user-based request) and organizational policies. By simplifying subnet management for application developers and IT teams in public cloud platforms, preventing IP address conflicts, and generally optimizing IP space utilization, the technology described herein offers an efficient and tailored solution compared to other systems methods and approaches; this provides scalability and performance in large-scale networks, overcoming some of the challenges of cloud-based infrastructure management.

In one implementation, machine learning techniques and/or other decision-making operations can be used to efficiently allocate new subnets based on application requirements and organizational policies. Over-allocation or under-allocation is reduced or even eliminated by considering both user-defined parameters and hybrid IT policies; fragmentation can be minimized by tree traversal to efficiently allocate IP address ranges within the available IP space.

Figure 11:
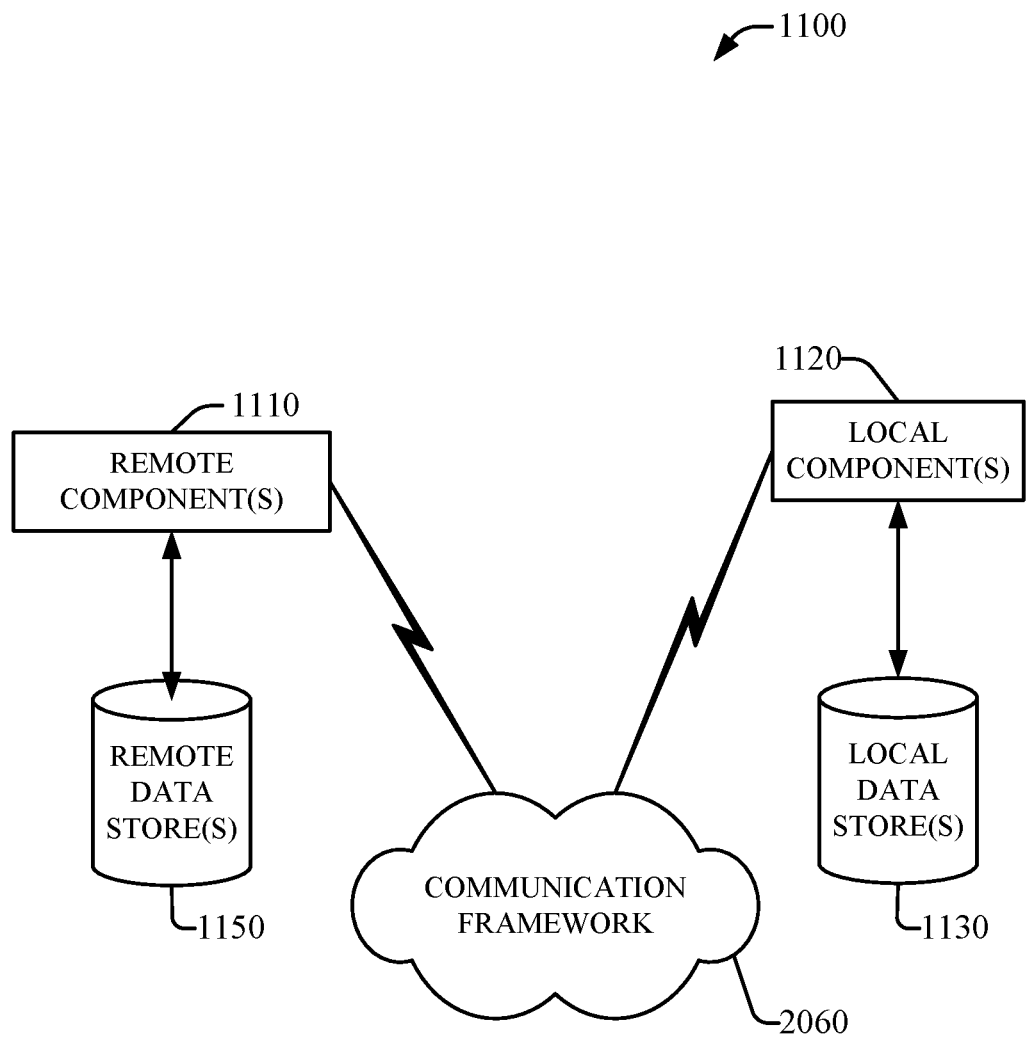
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
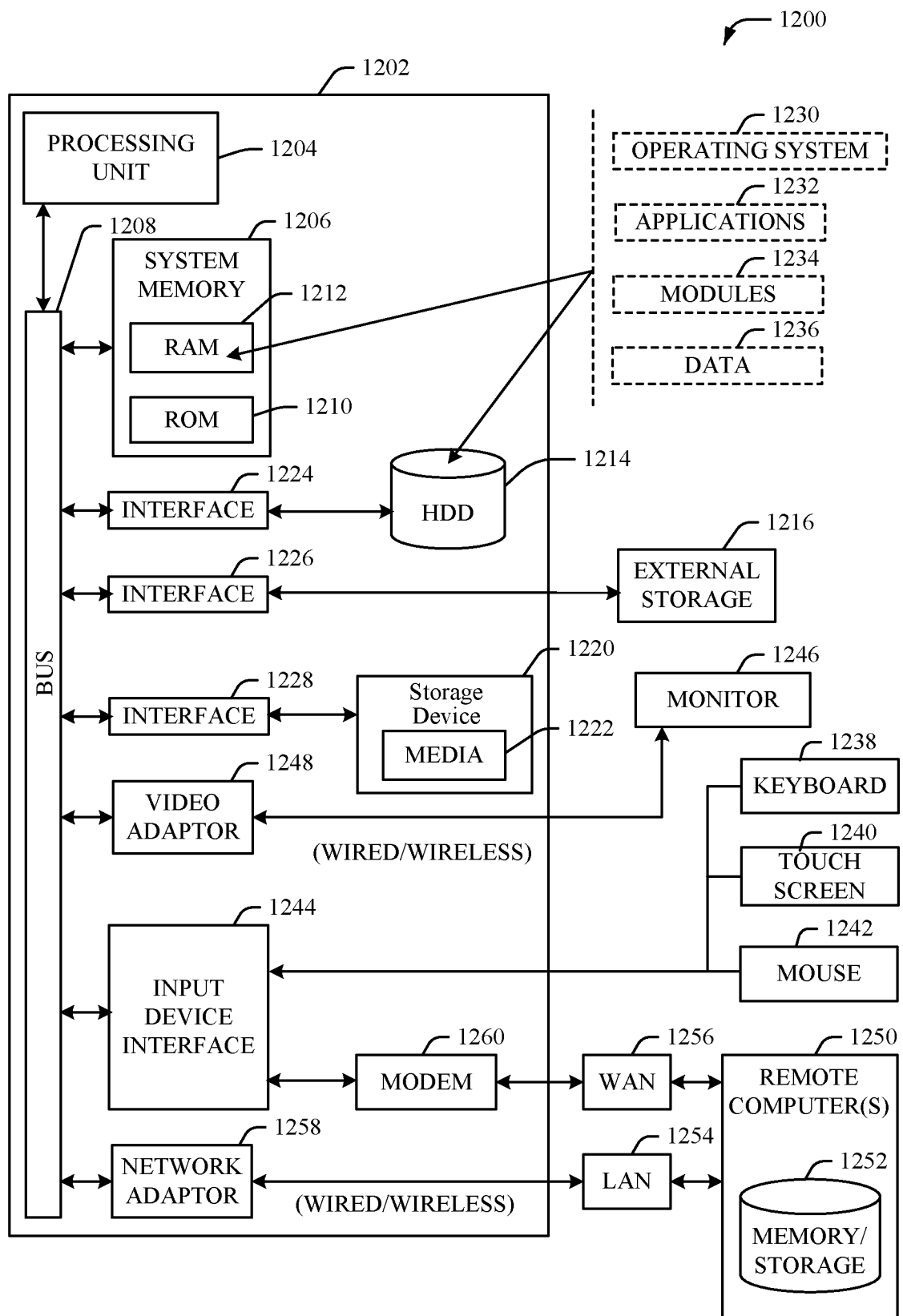
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
   accessing a data structure representing a virtual internet protocol (IP) address space of a cloud provider and allocated subnets of the virtual IP address space, wherein the virtual IP address space defines a group of IP addresses, and wherein the allocated subnets are allocated respective subnet ranges of IP addresses of the group of IP addresses of the virtual IP address space;
   receiving a request for subnet range allocation within the virtual IP address space, the request associated with input data corresponding to variable request parameter data, wherein the input data specifies user defined application specifications for a requested subnet in terms other than a specific size of the requested subnet;
   determining, using a machine learning model, based on the input data, an optimal size of the requested subnet to satisfy the user defined application specifications with respect to an optimization objective, and a subnet range of IP addresses of the group of IP address of the virtual IP address space to allocate that satisfies the optimal size and minimizes fragmentation of the virtual IP address space;
   creating the subnet comprising the subnet range of IP addresses;
   obtaining an identifier for the requested subnet; and
   returning the identifier of the requested subnet in response to the request.

2. The system of claim 1, wherein the operations further comprise updating the data structure to indicate that the subnet range of IP addresses are allocated addresses.

3. The system of claim 1, wherein the input data further comprises at least one of: a number of virtual hosts, container instance data, scale set parameter data, or on-premises routing data.

4. The system of claim 1, wherein the operations further comprise;
   obtaining, the virtual IP address space and allocation data corresponding to the allocated subnets of the virtual IP address space; and
   constructing the data structure based on the virtual IP address space and the allocated subnets of the virtual IP address space.

5. The system of claim 1, wherein the operations further comprise:
   obtaining policy data, and
   wherein the determining of the subnet range of IP addresses to allocate is further based on the policy data.

6. The system of claim 5, wherein the policy data comprises at least one of: virtual network IP space data, security rule data, identity and access management role data, audit service data, organizational billing data, or governance tag data.

7. The system of claim 1, wherein the determining of the subnet range of IP addresses to allocate is further based on subnet type-of-fit criterion data.

8. The system of claim 7, wherein the subnet type-of-fit criterion data comprises a best-fit indication, and wherein the determining of the subnet range of IP addresses to allocate comprises determining a group of candidate unallocated IP addresses of the virtual IP address space.

9. A method, comprising:
   accessing, by a system comprising at least one processor, a data structure representing a virtual internet protocol (IP) address space enabled using network equipment associated with a cloud provider and allocated subnets of the virtual IP address space, wherein the virtual IP address space defines a group of IP addresses, and wherein the allocated subnets are allocated respective subnet ranges of IP addresses of the group of IP addresses of the virtual IP address space;

receiving, by the system, a request for subnet range allocation within the virtual IP address space, the request associated with input data corresponding to variable request parameter data, wherein the input data specifies user defined application parameters for a requested subnet in terms other than a specific size of the requested subnet;

determining, by the system, using a machine learning model, based on the input data, an optimal size of the requested subnet to satisfy the user defined application parameters in accordance with an optimization objective, and a subnet range of IP addresses of the group of IP addresses of the virtual IP address space to allocate that meets the optimal size and minimizes fragmentation of the virtual IP address space;

creating, by the system, the subnet comprising the subnet range of IP addresses;

obtaining, by the system, an identifier for the requested subnet; and returning, by the system, the identifier of the requested subnet in response to the request.

10. The method of claim 9, further comprising:
updating, by the system, the data structure to indicate that the subnet range of IP addresses are allocated addresses.

11. The method of claim 9, wherein the input data further comprises at least one of: a number of virtual hosts, container instance data, scale set parameter data, or on-premises routing data.

12. The method of claim 9, further comprising:
obtaining, by the system, the virtual IP address space and allocation data corresponding to the allocated subnets of the virtual IP address space; and
constructing, by the system, the data structure based on the virtual IP address space and the allocated subnets of the virtual IP address space.

13. The method of claim 9, further comprising:
obtaining, by the system, policy data,
wherein the determining of the subnet range of IP addresses to allocate is further based on the policy data.

14. The method of claim 13, wherein the policy data comprises at least one of: virtual network IP space data, security rule data, identity and access management role data, audit service data, organizational billing data, or governance tag data.

15. The method of claim 9, wherein the determining of the subnet range of IP addresses to allocate is further based on subnet type-of-fit criterion data.

16. The method of claim 15, wherein the subnet type-of-fit criterion data comprises a best-fit indication, and wherein the determining of the subnet range of IP addresses to allocate comprises determining a group of candidate unallocated IP addresses of the virtual IP address space.

17. A non-transitory machine-readable medium, comprising executable instructions that, when executed by at least one processor, facilitate performance of operations, the operations comprising:
accessing a data structure representing a virtual internet protocol (IP) address space associated with a cloud provider and allocated subnets of the virtual IP address space, wherein the virtual IP address space defines a group of IP addresses, and wherein the allocated subnets are allocated respective subnet ranges of IP addresses of the virtual IP address space;
receiving a request for subnet range allocation with respect to the virtual IP address space, the request associated with input data corresponding to variable request parameter data, wherein the input data specifies user defined application needs for a requested subnet in terms other than a specific size of the requested subnet;
determining, using a machine learning model, based on the input data, an optimal size of the requested subnet to satisfy the user defined application needs with respect to an optimization objective, and a subnet range of IP addresses of the group of IP addresses of the virtual IP address space to allocate that has been determined to satisfy the optimal size and minimizes fragmentation of the virtual IP address space;
creating the subnet comprising the subnet range of IP addresses;
obtaining an identifier for the requested subnet; and
returning the identifier of the requested subnet in response to the request.

18. The non-transitory machine-readable medium of claim 17, wherein the operations further comprise:
updating the data structure to indicate that the subnet range of IP addresses are allocated addresses.

19. The non-transitory machine-readable medium of claim 17, wherein the input data further comprises at least one of: a number of virtual hosts, container instance data, scale set parameter data, or on-premises routing data.

20. The non-transitory machine-readable medium of claim 17, wherein the operations further comprise:
obtaining the virtual IP address space and allocation data corresponding to the allocated subnets of the virtual IP address space; and
constructing the data structure based on the virtual IP address space and the allocated subnets of the virtual IP address space.

* * * * *